United States Patent Office 3,580,940
Patented May 25, 1971

3,580,940
TRISILYLALKANES
James A. Webster, Dayton, Ohio, assignor to Monsanto Research Company, St. Louis, Mo.
No Drawing. Filed Aug. 25, 1969, Ser. No. 852,869
Int. Cl. C07f 7/02; C10m 1/50
U.S. Cl. 260—448.2          2 Claims

ABSTRACT OF THE DISCLOSURE

Trisilaalkanes of the formula

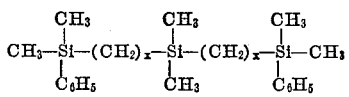

where $x=2$–6, useful as functional fluids. The areas of utility are heat-exchange media, gyro fluids, lubricants, anti-corrosive agents and viscosity-index improvers.

BACKGROUND OF THE INVENTION

This invention pertains to organic silicon compounds, particularly to chains of carbon atoms containing silicon atoms, and specifically to trisilaalkanes.

Previously, disilaalkanes were disclosed in U.S. Pat. Nos. 3,296,296-7 issued Jan. 3, 1967. Certain trisilaalkanes have been reported (Chemical Abstracts 55, column 14341, 1969), e.g. $Me_2Si(CH_2CH_2CH_2SiMe_3)_2$, $B_{.6}$ 136-8° C.; $PhMeSi(CH_2CH_2CH_2SiMe_3)_2$, $B_{.5}$ 188–90° C.; $Ph_2Si(CH_2CH_2CH_2SiMe_3)_2$, $B_{.5}$ 217–9° C.; etc.

SUMMARY OF THE INVENTION

An object of the invention is to provide trisilaalkanes useful as functional fluids, e.g., for hydraulic systems. A further object is to provide phenyl-terminated trisilaalkanes useful at high temperature and having oxidative stability and suitably low vapor pressures, and useful at low temperatures and having low pour point and suitable viscosity.

These and other objects hereinafter defined are met by the invention wherein there is provided the compound of the formula

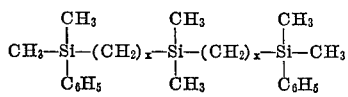

where $x$ is an integer of from 2 to 6.

Prior are compounds not having the structure of the presently disclosed trisilaalkanes may be deficient as functional fluids in one or more respects: thus, they may have high vapor pressures at elevated temperatures which result in loss of fluid from a hydraulic system; or they may have relatively high pour points, or may even be solids at room temperature; or they may have relatively high viscosities which reduce their effectiveness as functional fluids.

According to the invention, the presently provided trisilaalkanes are prepared, for example, by addition of dimethylphenylsilane with an appropriate diene intermediate as follows:

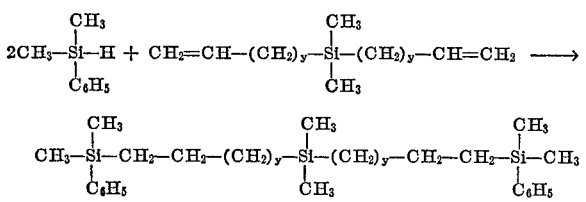

where $y$ is an integer of from 0 to 4. This type of reaction is well-known and is preferably conducted in the presence of a catalyst such as 5% platinum on carbon. All of the reaction conditions, i.e., temperature, reactant proportions, reaction time, etc. can be readily arrived at by easy experimentation.

The diene intermediate may be prepared, if necessary, by a Grignard reaction; e.g., where $y=2$, the Grignard reagent from 4-chloro-1-butene would be reacted with dichlorodimethylsilane according to the scheme:

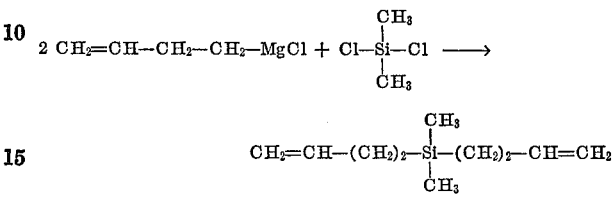

Examples of phenyl-terminated trialkaalkanes provided by the invention are:

2,5,5,8-tetramethyl-2,8-diphenyl-2,5,8-trisilanonane;
2,6,6,10-tetramethyl-2,10-diphenyl-2,6,10-trisilaundecane;
2,7,7,12-tetramethyl-2,12-diphenyl-2,7,12-trisilatridecane;
2,8,8,14-tetramethyl-2,14-diphenyl-2,8,14-trisilapentanedecane; and
2,9,9,16-tetramethyl-2,16-diphenyl-2,9,16-trisilaheptadecane.

Within the stated limits of $x$ equal to 2 to 6, the variation in chain length of the bridging alkylene $—(CH_2)_x—$ is unimportant.

The presently provided phenyl-terminated trisilaalkanes are stable well-characterized materials which are generally useful as functional fluids, since they are generally liquid over wide temperature ranges, possess high flash points and high ignition points and are characterized by very good resistance to heat, oxygen, and moisture. The thermal decomposition point of 2,6,6,10-tetramethyl-2,10-diphenyl-2,6,10 - trisilaundecane, for example, is 649° F. They remain liquid at temperatures which may be below $-70°$ F., and substantially higher than 600° F. Hence they are eminently suited for use as hydraulic fluids, especially in hydraulic systems which are subjected to widely varying temperature conditions. The presently provided trisilaalkanes possess good viscosity/temperature relationships, and are also useful, e.g., as heat-exchange media, gyro fluids and lubricants. Their very good oxidative stability makes them particularly valuable for use as lubricants and in other applications wherein exposure to air at high temperatures is encountered. They may be admixed, however, with additives conferring even higher stability and with adjuvants commonly used in the functional fluid art, e.g., extreme pressure-resisting additives, anti-corrosive agents, viscosity-index improvers, etc. Furthermore, they may be employed with other compositions having functional fluid characteristics, e.g., polyphenyl ethers, polyester fluids, polyalkylene glycols, hydrocarbon lubricants, halogenated hydrocarbon functional fluids, etc.

DESCRIPTION OF THE PREFERRED EMBODIMENTS

The invention is further illustrated by, but not limited to, the following examples.

Example 1

This illustrates the preparation of

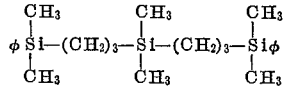

To a mixture of 68 g. (0.50 mole) phenyldimethylsilane and 0.5 g. of a 5% platinum-on-carbon catalyst was added gradually 35 g. (0.25 mole) diallyldimethylsilane.

The temperature of the reaction was maintained at 70–100° C. for several hours by the exothermic nature of the reaction and by external heating as the reaction subsided. The reaction mixture was filtered and distilled. The fraction boiling at 170–178° C. at about 0.25 mm. of mercury was collected: yield, 90 grams, $n_D^{25}$ 1.5169.

The product was established as 2,6,6,10-tetramethyl-2,10-diphenyl-2,6,10-trisilaundecane, the structure of which is represented above, by proton nuclear magnetic resonance chemical shifts, using tetramethylsilane as reference.

| Chemical shift (p.p.m.) | Assignment | Relative area Calcd. | Found |
|---|---|---|---|
| 7.3 (multiplet) | Aromatic protons | 10 | 10 |
| 1.3 (broad) | —CH$_2$— | 4 | 4 |
| 0.9–1.0 (broad multiplet) | Si—CH$_2$—C | 8 | 8 |
| 0.22 (single) | ($\phi$—Si)—CH$_3$ | 12 | 11.6 |
| −0.12 (single) | Si—CH$_3$ | 6 | 5.8 |

Example 2

2,6,6,10 - tetramethyl - 2,10 - diphenyl - 2,6,10 - trisilaundecane of Example 1 was evaluated for use as a hydraulic fluid by determining its decomposition temperature, autogenous ignition temperature, vapor pressure, oxidative stability, pour point, and kinematic viscosity. The following results were obtained:

(a) The decomposition temperature, as determined with the isoteniscope, was found to be 649° F. (343° C.). The decomposition temperature is herein defined as the temperature at which $dp/dt$ (rate of pressure rise) due to decomposition of the sample is 0.014 mm. Hg/sec.

(b) The autogenous ignition temperature, measured by ASTM procedure D–60T, and adhering to the detailed directions given by M. G. Zabetakis et al. in Industrial and Engineering Chemistry, 46, 2173 (1954), was found to be 565° F.

(c) Temperatures for vapor pressure equal to certain pressures of mercury were determined to be as follows:

| Temperature, ° C.: | Mm. Hg |
|---|---|
| 234 | 10 |
| 311 | 100 |
| 402 | 760 extrapolated |

(d) The oxidative stability as conducted by passing 20 liters/hour of air for 24 hours into a 20 ml. sample of the compound at 450° F. and then determining the change in viscosity as measured at 100° F. A 37.5% change in viscosity was observed.

(e) The compound was found to have a pour point of below minus 75° F. as determined by ASTM procedure D97–57.

(f) Kinematic viscosity determination by ASTM procedure D445–T 1960 gave the following values.

| Temperature, ° F.: | Centistokes |
|---|---|
| −40 | 1,200 |
| −65 | 18,640 |

From the above data it is evident that the compound even without any additive, is suitable for use as a hydraulic fluid at either extremely high or extremely low temperature.

What I claim is:

1. The compound of the formula

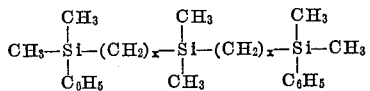

where $x$ is an integer of from 2 to 6.

2. The compound of claim 1 wherein $x$ is 3.

References Cited

UNITED STATES PATENTS

| 3,139,448 | 6/1964 | Hardy et al. | 260—448.2 |
| 3,296,296 | 1/1967 | Webster | 260—448.2 |
| 3,296,297 | 1/1967 | Webster. | |

OTHER REFERENCES

N. S. Nametkin et al., Zhurnal Obschei Khimii (1960), vol. 30, pp. 2594–5 QD 1.Z6

S. G. Durgar'yan et al. Zhurnal Obschei Khimii (1960), vol. 30, pp. 2600–1 and 2608, QD 1.Z6.

TOBIAS E. LEVOW, Primary Examiner

W. F. W. BELLAMY, Assistant Examiner

U.S. Cl. X.R.

252—49.7